US007233600B1

(12) United States Patent
Chau et al.

(10) Patent No.: US 7,233,600 B1
(45) Date of Patent: Jun. 19, 2007

(54) METHOD AND APPARATUS FOR DYNAMIC DSP RESOURCE MANAGEMENT

(75) Inventors: Wing C. Chau, Los Altos Hills, CA (US); Madhu Grandhi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/216,004

(22) Filed: Dec. 17, 1998

(51) Int. Cl.
*H04L 12/28* (2006.01)
(52) U.S. Cl. ........................................ 370/431; 370/464
(58) Field of Classification Search ................ 370/465, 370/431, 420, 419, 463, 464, 240, 241; 375/240, 375/241
See application file for complete search history.

(56) References Cited

U.S. PATENT DOCUMENTS

| 4,178,479 A | * | 12/1979 | McDonald et al. | ......... 370/376 |
|---|---|---|---|---|
| 5,367,678 A | | 11/1994 | Lee et al. | |
| 5,440,740 A | | 8/1995 | Chen et al. | |
| 5,452,306 A | * | 9/1995 | Turudic et al. | ............. 370/465 |
| 5,497,373 A | | 3/1996 | Hulen et al. | |
| 5,625,845 A | * | 4/1997 | Allran et al. | .................. 710/36 |
| 5,748,468 A | * | 5/1998 | Notenboom et al. | ........ 364/132 |
| 6,104,721 A | * | 8/2000 | Hsu | ........................... 370/431 |
| 6,611,531 B1 | * | 8/2003 | Chen et al. | .................. 370/458 |
| 6,704,308 B2 | * | 3/2004 | Sanders et al. | ............. 370/376 |

FOREIGN PATENT DOCUMENTS

GB  2200816 A  8/1988
WO  94/16528  7/1994

OTHER PUBLICATIONS

"Task Management of Multiple Digital Signal Processors," IBM Technical Diclosure Bulletin, vol. 34, No. 7B, pp. 237-239 (Dec. 1991).

(Continued)

*Primary Examiner*—Chi Pham
*Assistant Examiner*—Alexander O. Boakye
(74) *Attorney, Agent, or Firm*—Blakely, Sokoloff, Taylor & Zafman LLP (57) ABSTRACT

The present invention relates to a system and method of managing DSP resources within a network interface system (NIS). A Digital Signal Processing (DSP) resource manager dynamically allocates DSP resources to ensure that a DSP resource is always available to process an incoming call. The DSP resource manager reserves a sufficient number of DSP resources in a PCM group in order to ensure processing of any active communication channels. Each time a call is received and assigned to a T1 channel, the DSP resource manager recalculates the number of idle voice channels and the number of PCM resource channels which must be reserved to ensure processing of all idle voice channels. The DSP resource manager also recalculates DSP resource availability in the PCM group each time a call is deactivated. By tracking the number of idle voice channels in the system as well as the number of idle DSP resource channels in the PCM group, the DSP resource manager can reallocate the resources as necessary to optimize the ability of the system to fulfill enhanced compression mode requests, while also ensuring that there are sufficient resources available to process any call in PCM mode.

43 Claims, 7 Drawing Sheets

OTHER PUBLICATIONS

"Pulse Code Modulation (PCM) of Voice Frequencies"—General Aspects of Digital Transmission Systems, ITU-T Recommendation G.711, (*Geneva, 1972: further amended*) © ITU 1988, 1993 (6 pp. 2-sided).

40, 32, 24, 16 kbit/s Adaptive Differential Pulse Code Modulation (ADPCM), CCITT Recommendation G.726, *Geneva 1990*, © ITU 1990 (30 pp. 2-sided).

"Coding of Speech at 16 kbit/s Using Low-Delay Code Excited Linear Prediction" CCITT Recommendation G.728, *Geneva 1992*, © ITU 1992 (33 pp. 2-sided).

Coding of Speech at 8 kbit/s Using Conjugate-Structure Algebraic-Code-Excited Linear-Prediction (CS-ACELP), ITU-T Recommendation G.729, *Geneva 1996*, © ITU 1996 (20 pp. 2-sided).

Coding of Speech at 8 kbit/s Using Conjugate-Structure Algebraic-Code-Excited Linear-Prediction (CS-ACELP) Annex A: Reduced complexity 8 kbit/s CS-ACELP speech codec, ITU-T Recommendation G.729-Annex A, *Geneva 1996*, © ITU 1997 (8 pp. 2-sided).

\* cited by examiner

| Data Transferred Over Network | Compression Ratio | Channels Per DSP Resource |
|---|---|---|
| 64,000 bits/sec | 1:1 (Baseline PCM) | 16 |
| 34,000 bits/sec | 2:1 | 5 |
| 16,000 bits/sec | 4:1 | 3 |
| 12,000 bits/sec | 5.3:1 | 3 |
| 8,000 bits/sec | 8:1 | 2 |

METHOD AND APPARATUS FOR DYNAMIC DSP RESOURCE MANAGEMENT

BACKGROUND OF THE INVENTION

1. Field of the Invention

This invention relates to resource allocation within a computer or other network. More particularly, the present invention relates to the allocation of DSP Resources in a Digital Communications Network.

2. Description of the Related Art

Figure 1:
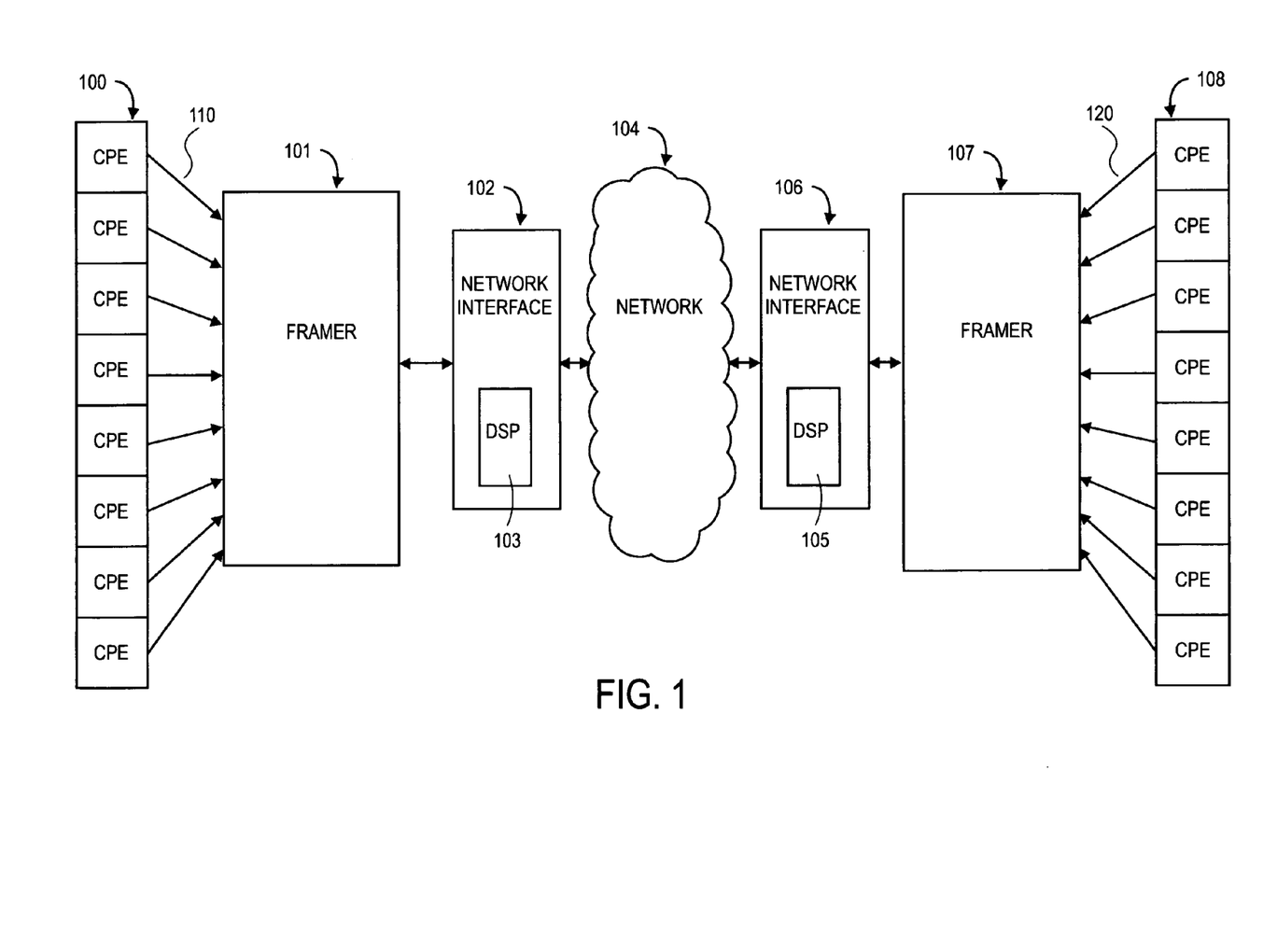
FIG. 1 shows generally a data network.

FIG. 1 generally depicts a digital network adapted to transport voice, data and other information. The network includes a plurality of Customer Premises Equipment nodes 100, 108 (hereinafter "CPE nodes"), framer modules 101, 107, Network Interface Systems 102, 106 (hereinafter "NISs"), DPS resources 103, 105 within each of the NISs, and network 104.

When a communication connection is requested from CPE node 100 to CPE node 108 the signal first travels from the CPE node 100 to framer module 101 over digital T1 carriers 110, 120. Before being transmitted over T1 carriers 110, 120, the signal from CPE node 108 is sampled and converted to a digital signal. A common sampling rate to convert the analog signal to digital is 8000 samples per second, with each digital sample represented by 8 bits of data. Thus, the data rate of the new digital signal is: 8000 samples/sec×8 bits=64,000 bits/sec. This technique is known as Pulse Code Modulation (hereinafter "PCM") and is used extensively throughout the backbone of the modern telephone system.

Figure 2:
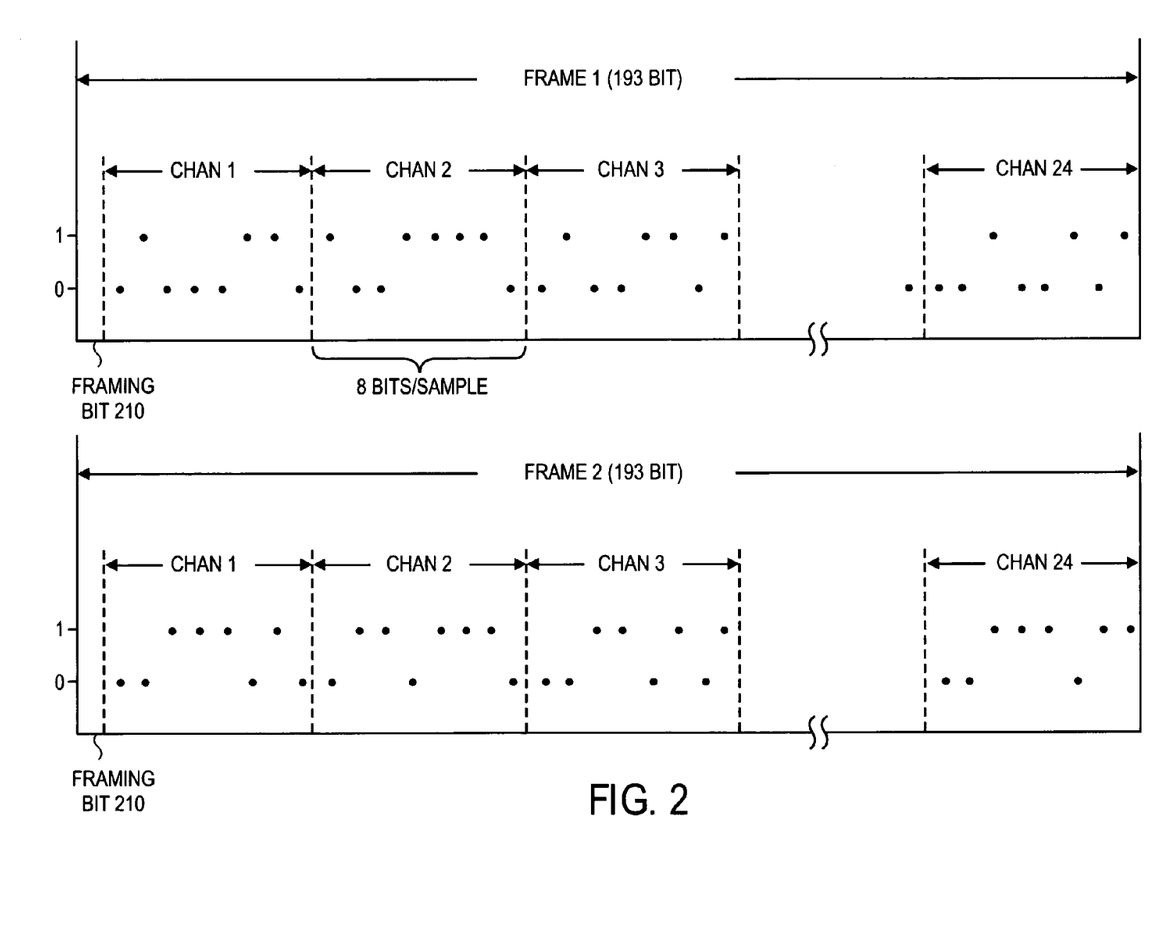
FIG. 2 shows a T1 carrier signal.

Although no international standard has been adopted, the T1 carrier is one method of PCM used throughout North America and Japan. The T1 carrier is comprised of 24 channels of digital data multiplexed together. As shown in FIG. 2, digitally sampled data from each of the 24 channels are packaged into successive frames of 8 bits/channel×24 channels+an additional framing bit 210=193 bits. Outside of North America and Japan a similar standard known as E1, is commonly implemented. E1 operates in a manner similar to T1 except that it uses 32 8-bit data samples (i.e., 32 channels) instead of 24.

After the signal has been sampled, converted to a digital signal and transmitted over a T1 carrier 110, as described above, it is then transferred to a framer module 101. The framer module 101 serializes the digital data from the plurality of T1 carriers 110 into a bit stream which is sent to NIS 102. An example of a known framer module is a Rockwell™ BT8370. In the NIS 102 the digital data samples are packaged according to the protocol used in network 104 (e.g., ATM). Additionally, although PCM by itself provides for a data compression rate of 8:1, it is often desirable to further compress the digital PCM data at NIS 102 in order to save bandwidth over the network. This can be accomplished using Digital Signal Processing (hereinafter "DSP") resource blocks 103, 105 within NIS 102. For example, if the 64,000 bits/second PCM signal is further compressed by DSP resource 103 at a compression ratio of 16:1 the resulting digital signal will be transmitted at 4,000 bits/second. This represents a significant reduction in required bandwidth across network 104 to transmit the same underlying signal. Such compression techniques are particularly useful in networks which are heavily loaded with network traffic. Examples of compression algorithms known in the art include the International Telegraph Union (hereinafter "ITU') standards G.711, G.726, G.729-A, G.729, and G.728.

Figure 3:
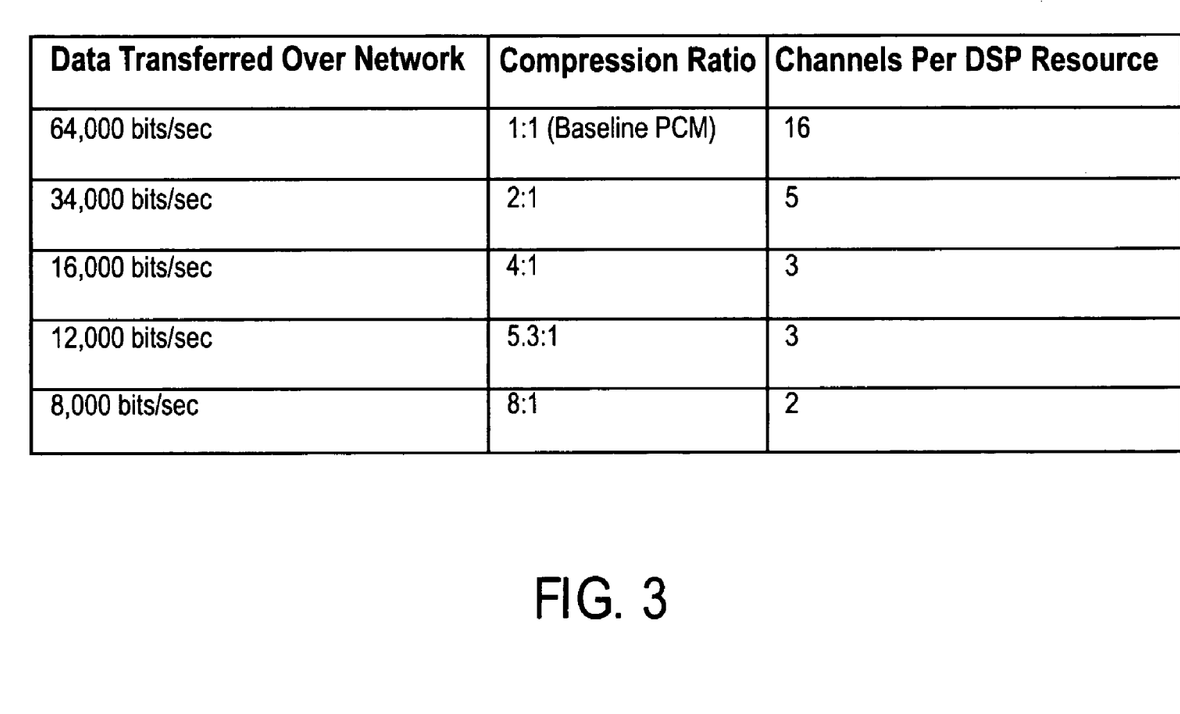
FIG. 3 shows a table illustrating the relationship between data compression ratio and channels processed per DSP resource.

However, there is a tradeoff between bandwidth savings over network 104 and the implementation of costly DSP resources 103 in NIS 102. In general, the higher the compression ratio required by the compression algorithm, the more DSP resources 103 are used up processing the compression request over a given period of time. Thus, referring to the table in FIG. 3, while a single DSP resource can process 16 channels of data if no compression is used (i.e., in baseline PCM mode), it can only process 5 channels if data is compressed at 2:1, and only 2 channels if the PCM signal is compressed at 8:1.

Figure 4:
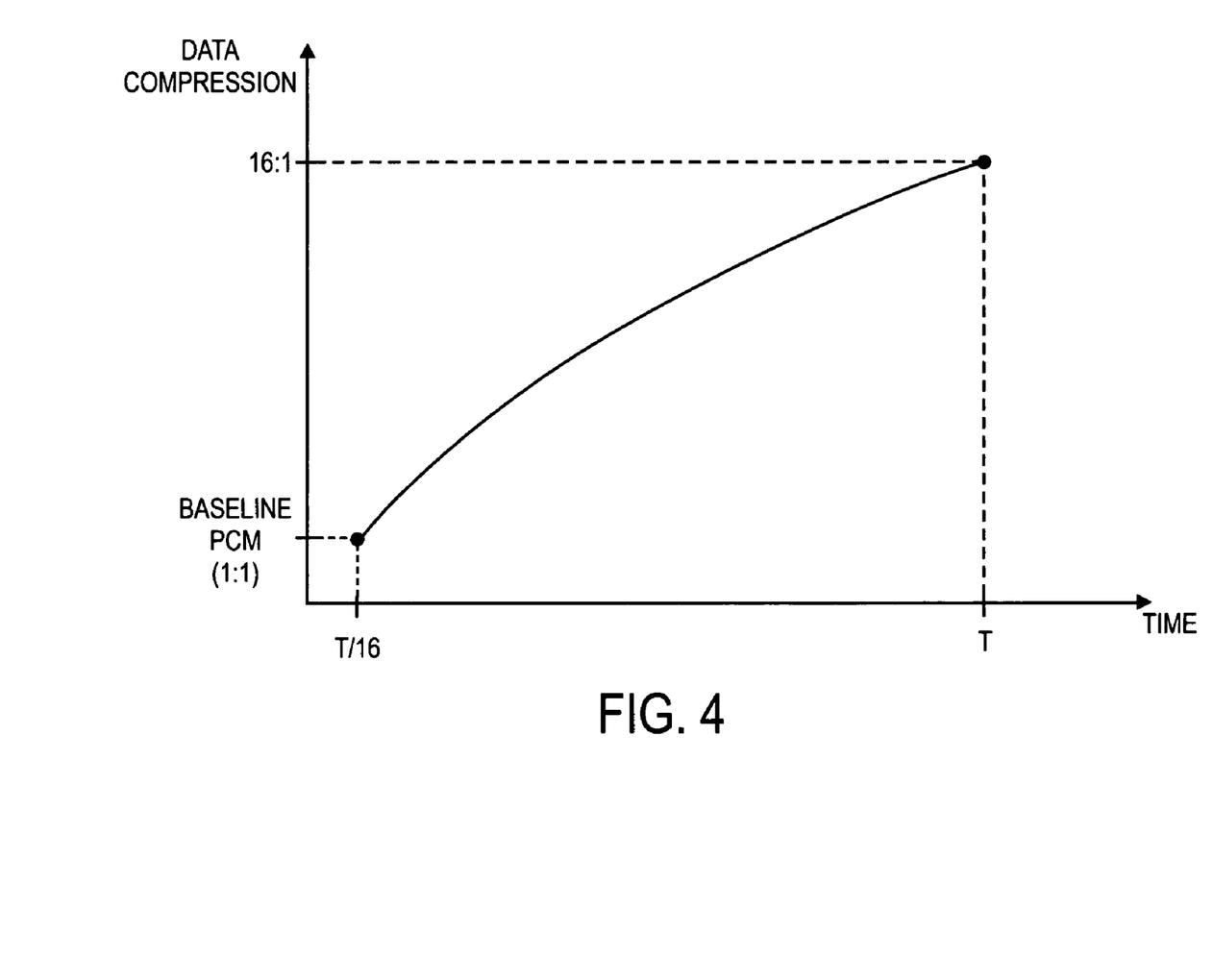
FIG. 4 shows a graph illustrating the relationship between data compression ratio and time required to compress data by DSP resources.

This is because the DSP resource has a limited amount of time in which to compress the data within a T1 frame before it must move on to the next frame of data. Referring to FIG. 4, 'T' represents the maximum amount of time that a DSP resource may spend compressing data from a frame before it must move on to the next successive frame (i.e., the data from frame 1 must be compressed before frame 2 arrives). While a single DSP resource can process 16 T1 channels per unit of time 'T' in baseline PCM mode (i.e., each channel requiring approximately 'T'/16 to process), the same DSP resource can only process one T1 channel per the same unit of time 'T' running at a compression ratio of 16:1. Thus, the chosen compression ratio will have a significant impact on DSP resource usage.

Following compression, the data samples are delivered through network 104 to NIS 106, where the data is decompressed and passed on to framer module 107. Framer module 107 reconstructs the original T1 signal which it transfers to CPE 108 over a T1 carrier 120. The system is bi-directional to ensure 2-way communication.

The management of the DSP resources in prior systems occurs without regard to whether the DSP resources are depleted. In other words, when multiple calls are received from the CPEs 100, the NIS 102 may have its DSP resources 103 consumed quickly. Once all DSP resources 103 in NIS 102 are allocated, any attempt to open a new communication channel through NIS 102 will result in a busy signal. What is needed is a DSP resource allocation system to ensure that there are always enough DSP resources 103 available in NIS 102 to process the incoming data by reserving enough DSP resources to process all idle T1 channels in PCM mode. In sum, a scheme for managing the DSP resources 103 in NIS 402 in order to reduce the possibility that a call request will be rejected is needed.

SUMMARY OF THE INVENTION

The present invention relates to a system and method of managing DSP resources within a network interface system (NIS). A Digital Signal Processing (DSP) resource manager dynamically allocates DSP resources to ensure that a DSP resource is always available to process an incoming call. The DSP resource manager reserves a sufficient number of DSP resources in a PCM group in order to ensure processing of any active communication channels. Each time a call is received and assigned to a T1 channel, the DSP resource manager recalculates the number of idle channels and the number of PCM resource channels which must be reserved to ensure processing of all idle channels. The DSP resource manager also recalculates DSP resource availability in the PCM group each time a call is deactivated. By tracking the number of idle channels in the system as well as the number of idle DSP resource channels in the PCM group, the DSP resource manager can reallocate the resources as necessary to optimize the ability of the system to fulfill enhanced compression mode requests, while also ensuring that there are sufficient resources available to process any call in PCM mode.

BRIEF DESCRIPTION OF THE DRAWINGS

A better understanding of the present invention can be obtained from the following detailed description in conjunction with the following drawings, in which.

DETAILED DESCRIPTION OF THE PREFERRED EMBODIMENT

Figure 5:
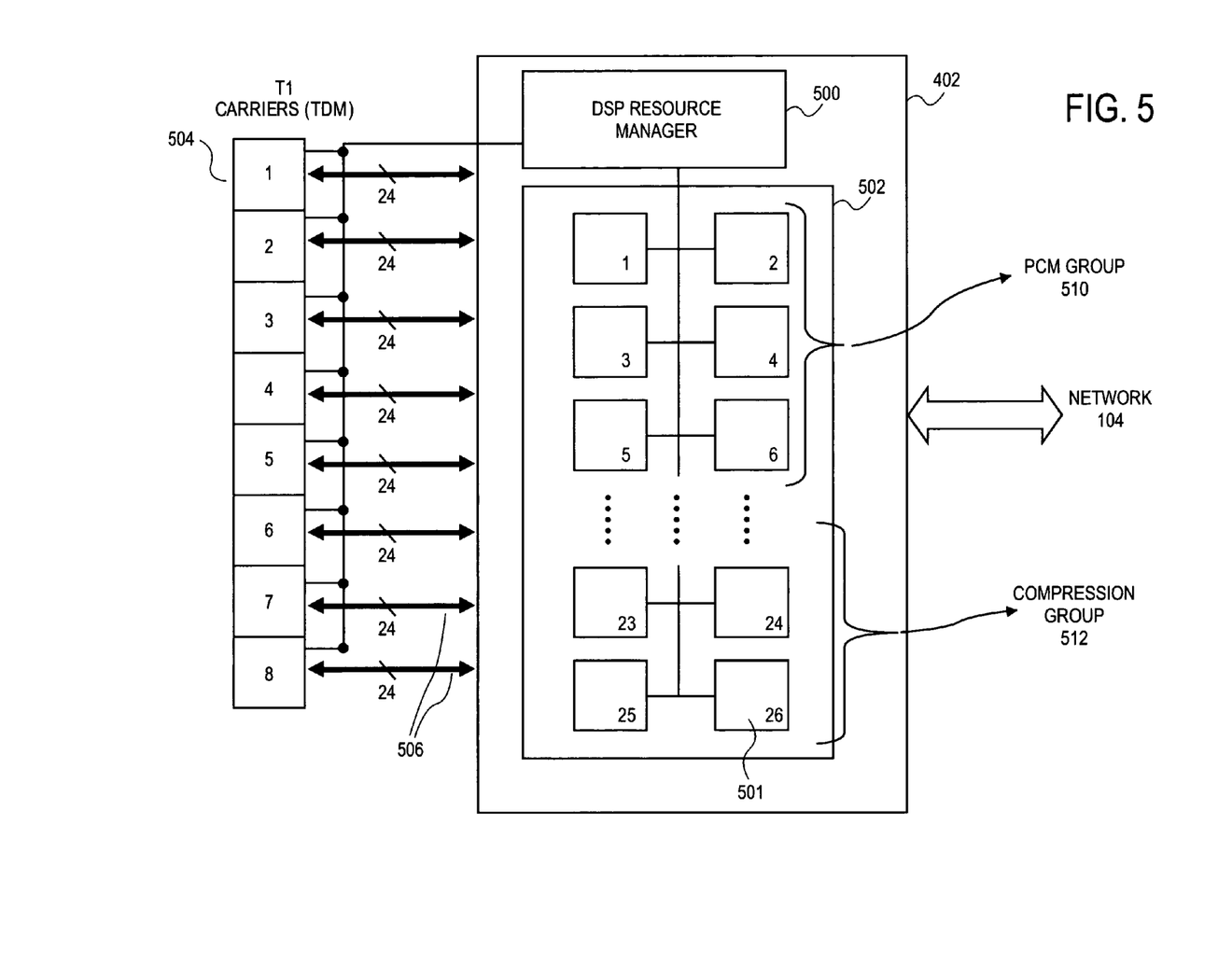
FIG. 5 illustrates a T1 carrier and a network interface system.

A system and method of managing the DSP Resources in a Network Interface System (NIS) is described. Referring to FIG. 5, a DSP resource manager 500 is used to dynamically allocate DSP resources 501 from a DSP resource block 502 to ensure that a DSP resource 501 is always available to process an incoming call.

As a call request is received by NIS 102, DSP Resource Manger 500 attempts assigns the call to DSP resource block 502 for data compression. In one embodiment, incoming calls are delivered through channelized T1 carriers 504. There may be eight T1 carriers 504, with each T1 carrier channelized into 24 channels 506, and a resource block 502 comprised of 26 DSP resources 501 (i.e., chips). However, one of ordinary skill in the art will readily recognize from the following discussion that, depending on the system configuration, a different number of carriers, channels or DSP resources could be employed without departing from the underlying principles of the present invention. Moreover, while the embodiment discussed below uses a T1-based transmission scheme, other transmission schemes such as E1, T3, etc., could be implemented as well. Using 8 T1 carriers 504, the present configuration provides for 8 carriers×24 channels=192 total channels to be managed by the DSP resource manager 500.

In the present embodiment, the DSP resource manager 500 allocates the 26 DSP resources 501 in such a way as to ensure DSP resource availability to process any incoming call in PCM mode. The 26 DSP resources 501 from resource block 502 are divided into two groups: a PCM group 510 and a Compression Group 512. The PCM Group 510 is a group of DSP resources that have been reserved to process incoming T1 channels in baseline PCM mode (non-compression mode). Thus, the PCM group 510 is made up of some variable number of the 26 DSP resources 501. Resources 501 are allocated to the compression group 512 to process calls requesting compression ratios other than baseline PCM. Accordingly, if N of the DSP resources 501 are assigned to the PCM group 510, then the compression group 512 is comprised of 26-N of the DSP resources 501.

The number of DSP resources 501 allocated to the PCM group 510 will depend on the number of T1 channels that are active (ready to receive incoming/outgoing calls) and the number of active channels requesting compression. To illustrate the operation of the DSP resource manager 500, if it is initially assumed that all of the 192 T1 channels are active and that each DSP resource 501 can process 16 channels in PCM mode, and that no channels are currently allocated to the compression group, a total of 192/16=12 DSP resources 501 must be allocated to the PCM group 510 to ensure that any call requesting PCM mode can be processed. This means that 26−12=14 DSP resources 501 are initially allocated to the compression group 512. Accordingly, if the first 28 incoming calls request 8,000 bit compression (8:1), then all of the 14 DSP resources 501 in the compression group 512 will be used up. This is because at 8,000 bit compression, each of the DPS resources can only process 2 T1 channels (see FIG. 3).

If a $29^{th}$ call received by the NIS 102 now requests compression, the call will be rejected in prior art systems because all of the DSP resources 501 in the compression group 512 are busy. However, the present DSP resource manager 500 will attempt to reallocate DSP resources 501 within the resource block 502. Specifically, DSP resource manager 500 will recalculate the number of DSP resources 501 required in the PCM group 510 based on the number of active T1 channels and the number of active channels assigned to the compression group. Assuming that 28 incoming calls have been allocated to the compression group as stated above, then 192 (total active channels)−28 (active calls assigned to compression group)=164 active channels which must be provided for by the PCM group 510. Since each DSP resource 501 can process 16 calls in PCM mode, 164/16=10.25 DSP resources 501 are required if all 164 channels transmit calls requesting PCM mode. This value is rounded up to 11 because a single DSP resource cannot be split between the compression group 512 and the PCM group 510. Accordingly, once DSP resource manager 500 reevaluates the DSP resource allocation scheme it will reassign one of the 12 DSP resources 501 in the PCM group 510 to the compression group 512 and call 29 will be processed using the compression algorithm which it requested. By continually reevaluating DSP resource allocation in this manner, the DSP resource manager 500 provides flexibility for processing calls and at the same time ensures that there are always sufficient DSP resources 501 to process any new call in PCM mode.

Assuming that DSP resource 501 has been reallocated from the PCM group 510 to the compression group 512 as described above and is operating at full capacity (e.g., processing calls 29 and 30 using 8,000 bit compression), when a new call request (i.e., call 31) is sent from a CPE node 100 requesting compression, DSP resource manager 500 will not be able to reallocate another DSP resource 501 to handle the compression request. This is because [192 (active channels)−30 (channels using compression group)]/ 16 (channels per DSP resource 501)=10.125. Thus, all 11 DSP resources 501 currently allocated to the PCM group 510 are required to stay there to ensure PCM availability. Accordingly, DSP resource manager 500 will send a response to CPE node 100 indicating that no compression resources are available. However, the response may also indicate that a DSP resource 501 from the PCM group 501 is available. At this point CPE node 100 can choose to establish communication using the DSP resource 501 in the PCM group 510 or can try back at a later time (when a DSP resource 501 from the compression group 512 may be available). In this way, DSP resource manager 500 provides a caller with an option rather than simply denying the call request outright (e.g., with a busy signal).

Up until now it has been assumed that all 192 T1 channels 506 (provided by the 8 T1 carriers 504) are active. In one embodiment, however, DSP resource manager 500 is capable of activating and deactivating one or more T1 channels 506 based on network traffic requirements. Significantly, when the DSP resource manager 500 reserves enough DSP resources 501 in the PCM group 510 as described above, it is doing so based on the number of idle channels of active T1 carriers rather than inactive channels of inactive T1 carriers. In other words, an idle channel is a channel on an active T1 line which is not currently in use (i.e., not currently supporting a call). By contrast, an inactive channel is a channel on an inactive T1 line. Inactive channels are not factored into the equation used to reserve DSP resources 501 in the PCM group 510 until a request to activate a new T1 line is received. When this happens, additional DSP resources 501 must be allocated for the additional channels. With these new variables in mind, the following is a detailed description of the logic followed by the DSP resource manager upon receiving a new call request and a call deactivation request.

Figure 6:
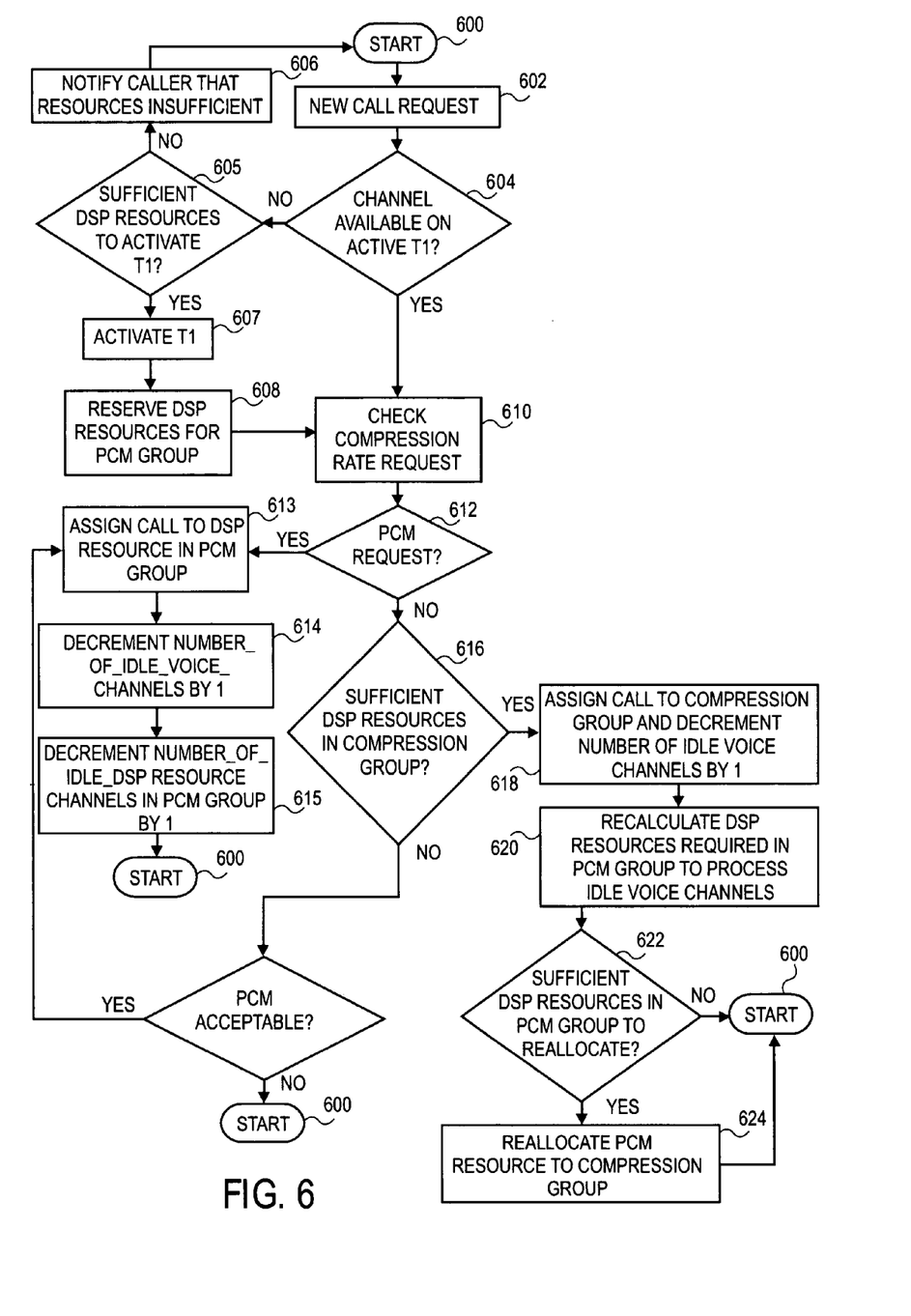
FIG. 6 is a flow diagram illustrating DSP resource manager logic when a new call is received.

FIG. 6 is a flowchart which illustrates the steps taken by DSP resource manager 500 when a new call request is received. When a new call is received at step 602, DSP resource manager 500 first determines whether or not there is an open channel on an active T1 line at step 604. If there is an open channel on an active T1, DSP resource manager 500 checks the compression rate requested at step 610. If there is no channel available on an active T1 line, DSP resource manager 500 attempts to initialize a new T1 line. First, DSP resource manager 500 determines if there are sufficient DSP resources 501 available to process all channels if a new T1 line is activated 605. If not, the caller is notified that there are insufficient resources available and the call is not activated (step 606). If there are sufficient DSP Resources 501 available to process all channels of a new T1, DSP resource manager 500 activates the T1 line at step 607. Each time a new T1 line is activated, DSP resource manager 500 allocates sufficient DSP resources 501 to the PCM group 510 to ensure that if all channels become active (i.e., receive calls), the PCM group 510 will have sufficient DSP resources 501 to process the calls (step 608).

As previously stated, a single DSP resource 501 is capable of processing 16 channels in PCM mode. Accordingly, for a T1 carrier 504 which is channelized into 24 channels 506, two DSP Resources must initially be reserved in the PCM group 510 to ensure processing of the newly activated T1 carrier at step 608. However, if a second T1 line is activated, only one additional DSP resource 501 needs to be allocated since the processing capability in one of the two DSP resources 501 initially reserved when the first T1 line was activated is only being partially used. That is, the second DSP resource 501 is still capable of processing an additional 8 channels: 24 (channels/T1 carrier)–16 (channels/DSP resource)=8 (additional channels that the DSP resource can process).

At step 610 DSP resource manager 500 checks the compression rate requested by the incoming call. If PCM is requested (step 612), the call is assigned to a channel from a DSP resource in the PCM group 510 (step 613). DSP resource manager 500 then updates two data values which it uses to keep track of DSP resource availability. In step 614 it decreases "the number of idle voice channels" variable by one 614, and then in step 615 it decreases the "number of idle DSP resource channels in PCM group" by 1.

If at step 612 DSP resource manager 500 determines that the incoming call requests compression, it attempts to assign the call to the compression group 512. In step 616, DSP resource manager 500 determines if there are sufficient DSP resources 501 in compression group 512 to process the call at the highest specified compression rate (the call may request more than one compression rate) in order to save bandwidth across network 104. If DSP resources 501 in compression group 512 are insufficient to implement any of the requested compression algorithms, DSP resource manager 500 notifies the CPE node 100 requesting compression. If PCM transmission through network 104 is adequate, CPE node 100 can accept a channel using PCM mode (recall that a PCM channel should always be available). The call is then assigned to PCM group 510 at step 613. If, however, PCM is inadequate CPE node 100 rejects PCM mode and can try back at a later time (starting from step 600). In this case, the caller may receive a busy signal.

If there are sufficient DSP resources 501 in the compression group 512 to process the request at step 616, the call is assigned to the compression group 512 (step 618). Once a call is assigned to the compression group 512, DSP resource manager 500 decrements the "number of idle voice channels" variable by one (step 620). DSP resource manager 500 then recalculates the number of DSP resources 501 required in the PCM group 510 to process all idle voice channels. If PCM group 510 contains more resources 501 than necessary, they are reallocated to the compression group 512 in step 624).

Figure 7:
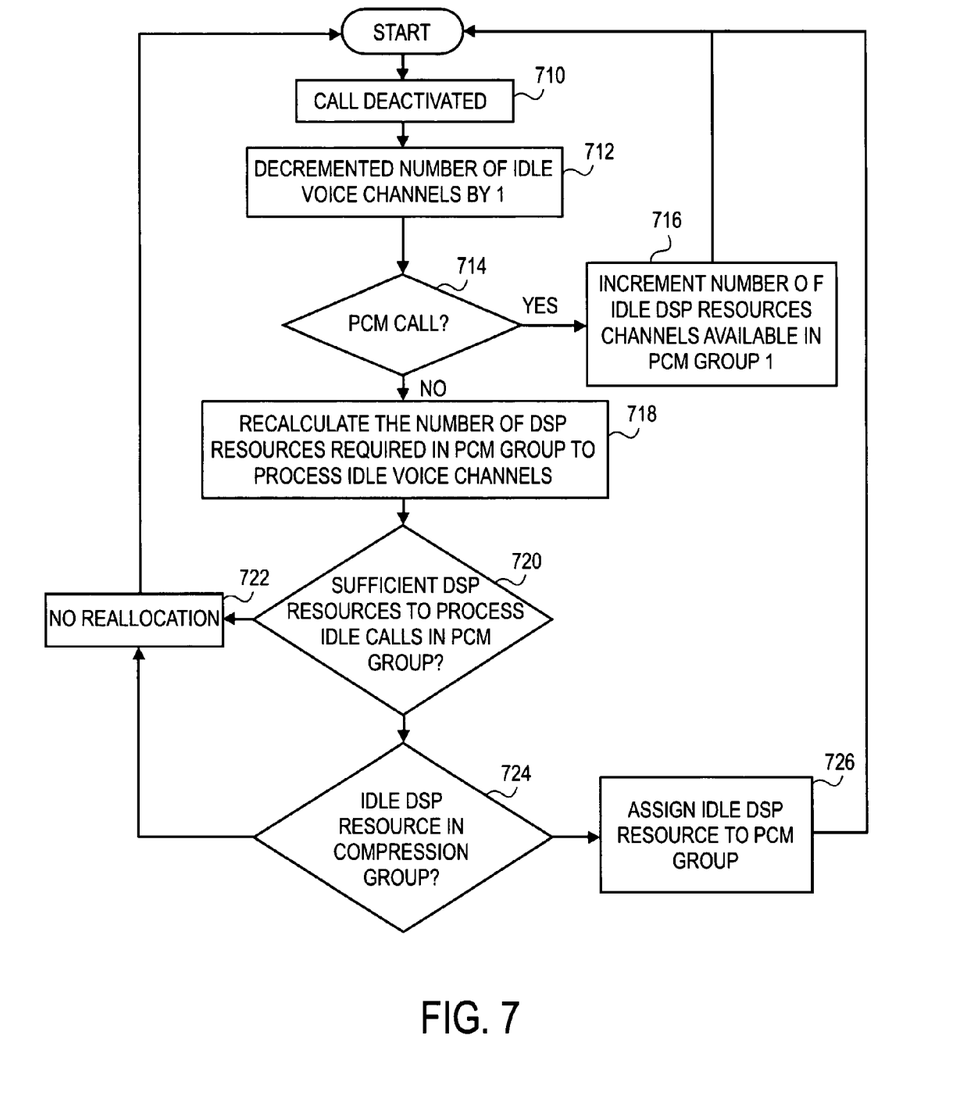
FIG. 7 is a flow diagram illustrating DSP resource manager logic when a call is deactivated.

FIG. 7 is a flowchart which illustrates the steps taken by DSP resource manager 500 for a call deactivation. DSP resource manager 500 is notified when a call has been deactivated. If a call has been deactivated (step 710), the "number of idle voice channels" variable is incremented by one in step 712. If the deactivated call was handled by a DSP resource 501 in the PCM group 510 (step 714), the "number of idle DSP resource channels available in the PCM group" variable is also incremented by one (step 716), since the deactivation of the call has opened a DSP resource 501 channel in the PCM group 510.

If the call was being handled by a DSP resource 501 in the compression group 512, DSP resource manager 500 recalculates the number of DSP resources needed in the PCM Group 510 at step 720 (i.e., so that there are sufficient DSP resources 501 to process any calls received on the idle voice channels). If there are sufficient DSP resources 501, no reallocation is necessary (step 722). If, however, there are insufficient DSP resources 501, DSP resource manager 500 determines whether there are any idle DSP resources in the compression group 512 (step 724). If so, the idle DSP resources 501 are reallocated from the compression group 512 to the PCM group 510 (step 726). If not, DSP resource manager 500 does not reallocate (step 722).

A scheme for DSP resource allocation has been described. As disclosed, a DSP resource manager 500 ensures that a sufficient number of channels are available for PCM processing of any channel on an active T1 line. In one embodiment, tracking and reallocation are done on a call by call basis. Reallocation operations are performed after each call is activated or deactivated. Recalculation and reallocation may also take place as each T1 line is activated, or at some other interval during processing.

One of ordinary skill in the art will readily recognize from the following discussion that alternative embodiments of the structures and methods illustrated herein may be employed without departing from the principles of the invention. Throughout this detailed description, numerous specific details are set forth such as specific digital carrier types (i.e., T1) and network protocols (i.e., ATM) in order to provide a thorough understanding of the present invention. It will be appreciated by one having ordinary skill in the art, however, that the present invention may be practiced without such specific details. In other instances, well known data communication techniques have not been described in detail in order to avoid obscuring the subject matter of the present invention. The invention should, therefore, be measured in terms of the claims which follow.

What is claimed is:

1. A system, comprising:
a digital signal processing (DSP) resource manager configured to ensure DSP availability for each of a number of channels as individual ones of said channels are activated or deactivated, wherein the DSP resource manager is configured to ensure DSP availability by controlling allocation of a number of DSP resources among the activated channels, wherein said DSP resources are assigned to DSP groups according to information compression requests associated with the activated channels, wherein the number of DSP resources assigned to each of the DSP groups is recalculated each time one of the channels is activated or deactivated.

2. A system as in claim 1, wherein each of said DSP resources is configured to process one or more of said voice channels depending upon the compression scheme selected.

3. The system as in claim 1, wherein said DSP resources are assigned to a pulse code modulation (PCM) group to process activated channels in a baseline PCM mode and a compression group to process activated channels in a compression ratio other than the baseline PCM mode, and wherein the DSP resource manager is configured to reserve a sufficient number of DSP resources in the PCM group to ensure processing of any of the activated channels.

4. The system as in claim 3, wherein said DSP resource manager is configured to recalculate a number of idle channels and a number of PCM resource channels that must be reserved to ensure processing of all the number of idle channels.

5. The system as in claim 4, wherein said DSP resource manager is further configured to recalculate DSP resource availability in the PCM group each time one of said channels is deactivated.

6. A system, comprising:
a digital signal processing (DSP) resource manager configured to ensure DSP availability for each of a number of channels as individual ones of said channels are activated or deactivated, wherein the DSP resource manager is configured to ensure DSP availability for each of said channels by assigning a sufficient number of DSP resources to each of a number of DSP groups to process information transmitted within all activated channels, wherein the number of DSP resources assigned to each of the DSP groups is recalculated each time one of the channels is activated or deactivated.

7. A system as in claim 6, wherein the DSP resources are reallocated between each of the DSP groups to ensure processing of all activated channels and to maximize enhanced compression capabilities.

8. A system as in claim 6, wherein various numbers of said channels are grouped together in a carrier system.

9. A system as in claim 8, wherein said carrier system is comprised of T1 lines.

10. A system as in claim 9, wherein the DSP resource manager is configured to initialize each of a number of T1 lines depending on the availability of DSP resources.

11. A system as in claim 6, wherein said channels comprise voice channels.

12. A method comprising:
managing a digital signal processing (DSP) system to ensure DSP availability for each of a number of channels as individual ones of said channels are activated or deactivated, wherein a DSP resource manager is configured to ensure DSP availability for each of said channels by assigning a sufficient number of DSP resources to each of a number of DSP groups to process information transmitted within all activated channels, wherein the number of DSP resources assigned to each of the DSP groups is recalculated each time one of the channels is activated or deactivated; and
grouping various number of said channels together in a carrier system.

13. A method as in claim 12, wherein said carrier system is comprised of T1 lines.

14. A method as in claim 13, wherein each of a number of T1 lines is initialized as DSP resources become available.

15. A method comprising:
managing a digital signal processing (DSP) system to ensure DSP availability for each of a number of channels as individual ones of said channels are activated or deactivated; and
allocating a number of DSP resources among activated ones of the channels to ensure DSP availability, wherein allocation of said DSP resources to DSP groups is performed by a DSP resource manager according to information compression requests associated with the activated channels, wherein the number of DSP resources assigned to each of the DSP groups is recalculated each time one of the channels is activated or deactivated.

16. A method as in claim 15, wherein configuring of each of said DSP resources to process one or more of said activated channels is dependent upon the compression scheme selected.

17. A method as in claim 16, further comprising assigning a sufficient number of DSP resources to each of a number of DSP groups to process information transmitted within all activated channels.

18. A method as in claim 17, further comprising recalculating the number of DSP resources assigned to each of the DSP groups is performed by the DSP resource manager each time one of the channels is activated or deactivated.

19. A method as in claim 18, wherein reallocating the DSP resources between each of the DSP groups by the DSP resource manager, is performed as necessary, each time a call is activated or deactivated.

20. The method as in claim 15, wherein allocation comprises assigning said DSP resources to a pulse code modulation (PCM) group to process activated channels in a baseline PCM mode or a compression group to process activated channels in a compression ratio other than the baseline PCM mode according to the information compression requests.

21. The method as in claim 20, further comprising reserving, by the DSP resource manager, a sufficient number of DSP resources in the PCM group to ensure processing of any of the activated channels.

22. The method as in claim 21, further comprising recalculating, by the DSP resource manager, a number of idle channels and PCM group channels that must be reserved to ensure processing of all the idle channels.

23. The method as in claim 21, further comprising recalculating, by the DSP resource manager, the DSP availability in the PCM group each time one of said channels is deactivated.

24. A system comprising:
a plurality of digital signal processing (DSP) resources; and
a DSP resource manager configured to allocate the DSP resources among DSP resource groups according to requirements of a plurality of channels utilizing the DSP resources, allocating sufficient DSP resources to one of the DSP resource groups to process all of the plurality of channels, wherein the number of DSP resources assigned to each of the DSP groups is recalculated each time one of the channels is activated or deactivated.

25. The system as claimed in claim 24 wherein the DSP resource manager allocates the DSP resources into two or more DSP resource groups.

26. The system as claimed in claim 25 wherein one of the DSP resource groups is a compression group comprised of DSP resources which compress voice and data information transmitted over the channels.

27. The system as claimed in claim 26 wherein one of the DSP resource groups is a PCM group comprised of DSP resources which compress the voice and data information using pulse code modulation ("PCM").

28. The system as claimed in claim 25 wherein each of the plurality of channels is comprised of active channels and inactive channels.

29. The system as claimed in claim 27 wherein the PCM group contains sufficient DSP resources to process all of the channels not being processed by the compression group.

30. The system as claimed in claim 28 wherein the DSP resource manager allocates sufficient DSP resources to a first DSP resource group to process all of the active channels not being processed by the remaining DSP resources.

31. The system as claimed in claim 30 wherein the first DSP resource group is a PCM group comprised of DSP resources which perform pulse code modulation.

32. The system as claimed in claim 31 including a compression group comprised of DSP resources which compress channels at a higher compression ratio than DSP resources within the PCM group.

33. The system as claimed in claim 32 wherein the DSP resource manager reallocates the number of DSP resources required in the PCM group to process all active channels not being processed by the remaining DSP resources after one or more of the channels are inactivated or deactivated.

34. The system as claimed in claim 33 wherein groups of the plurality of channels are grouped together in a carrier system.

35. The system as claimed in claim 34 wherein the carrier system is comprised of T1 carriers.

36. An apparatus comprising:
means for managing a digital signal processing (DSP) system to ensure DSP availability for each of a number of channels as individual ones of said channels are activated or deactivated, wherein a DSP resource manager is configured to ensure DSP availability for each of said channels by assigning a sufficient number of DSP resources to each of a number of DSP groups to process information transmitted within all activated channels, wherein the number of DSP resources assigned to each of the DSP groups is recalculated each time one of the channels is activated or deactivated; and
means for grouping various number of said channels together in a carrier system.

37. An apparatus as in claim 36, wherein said carrier system is comprised of T1 lines.

38. An apparatus as in claim 37, wherein each of a number of T1 lines is initialized as DSP resources become available.

39. An apparatus comprising:
means for managing a digital signal processing (DSP) system to ensure DSP availability for each of a number of channels as individual ones of said channels are activated or deactivated; and
means for allocating a number of DSP resources among activated ones of the channels to ensure DSP availability, wherein allocation of said DSP resources to DSP groups is performed by a DSP resource manager according to information compression requests associated with the activated channels, wherein the number of DSP resources assigned to each of the DSP groups is recalculated each time one of the channels is activated or deactivated.

40. An apparatus as in claim 39, wherein configuring of each of said DSP resources to process one or more of said activated channels is dependent upon the compression scheme selected.

41. An apparatus as in claim 40, further comprising a means for assigning a sufficient number of DSP resources to each of a number of DSP groups to process information transmitted within all activated channels.

42. An apparatus as in claim 41, further comprising a means for recalculating the number of DSP resources assigned to each of the DSP groups is performed by the DSP resource manager each time one of the channels is activated or deactivated.

43. An apparatus as in claim 42, wherein reallocating the DSP resources between each of the DSP groups by the DSP resource manager, is performed as necessary, each time a call is activated or deactivated.

* * * * *